(12) United States Patent
Yu et al.

(10) Patent No.: US 10,164,951 B2
(45) Date of Patent: Dec. 25, 2018

(54) ESTABLISHING SECURE COMMUNICATION OVER AN INTERNET OF THINGS (IOT) NETWORK

(71) Applicant: SKY1 Technology Limited, Hong Kong (HK)

(72) Inventors: Kenneth Keung Yum Yu, Hong Kong (HK); Chan Yiu Ng, Hong Kong (HK)

(73) Assignee: SKYI Technology Limited, Hong Kong (HK)

( * ) Notice: Subject to any disclaimer, the term of this patent is extended or adjusted under 35 U.S.C. 154(b) by 0 days.

(21) Appl. No.: 15/961,868

(22) Filed: Apr. 24, 2018

(65) Prior Publication Data

US 2018/0309734 A1 Oct. 25, 2018

Related U.S. Application Data

(60) Provisional application No. 62/490,019, filed on Apr. 25, 2017.

(51) Int. Cl.
| | |
|---|---|
| *H04L 9/32* | (2006.01) |
| *H04L 29/06* | (2006.01) |
| *G06F 21/60* | (2013.01) |
| *H04L 9/08* | (2006.01) |
| *H04L 29/08* | (2006.01) |

(52) U.S. Cl.
CPC ........ *H04L 63/0428* (2013.01); *G06F 21/602* (2013.01); *G06F 21/606* (2013.01); *H04L 9/0861* (2013.01); *H04L 9/0894* (2013.01); *H04L 63/062* (2013.01); *H04L 63/102* (2013.01); *H04L 63/12* (2013.01); *H04L 67/12* (2013.01)

(58) Field of Classification Search
CPC ... H04L 63/0428; H04L 63/02; H04L 63/062; H04L 63/12; H04L 9/0861; H04L 9/0894; H04L 67/12; G06F 21/602; G06F 21/606
USPC .......................................................... 713/168
See application file for complete search history.

(56) References Cited

U.S. PATENT DOCUMENTS

| | | | |
|---|---|---|---|
| 8,279,777 B2 | 10/2012 | Stewart | |
| 8,724,812 B2 * | 5/2014 | Senese ................. | H04L 63/061 380/259 |

(Continued)

FOREIGN PATENT DOCUMENTS

| | | | | |
|---|---|---|---|---|
| WO | 2014/036977 A1 | 3/2014 | | |
| WO | WO-2017081208 A1 * | 5/2017 | ............. | H04L 9/006 |

*Primary Examiner* — Samson B Lemma

(57) ABSTRACT

A method includes performing by at least one host entity implemented in a network, receiving an encryption key generated by a key server and a key identifier associated with said encryption key, generating a header comprising an information identifier associated with an information to be protected, the device identifier corresponding to the key server and the key identifier associated with the encryption key, encrypting said information using said encryption key and associating the header with the encrypted information, transmitting said encrypted information and the associated header to a receiving entity and transmitting an authorization information, said key identifier, and said header to the key server. Further, in response to determination that the receiving entity is authorized to access the encrypted information, the receiving entity decrypts the encrypted information using decryption key received from the key server.

18 Claims, 9 Drawing Sheets

(56) References Cited

U.S. PATENT DOCUMENTS

| | | | |
|---|---|---|---|
| 8,825,999 B2* | 9/2014 | Mohamed | H04L 63/045 |
| | | | 380/282 |
| 9,003,177 B2 | 4/2015 | Rollins | |
| 9,178,694 B2 | 11/2015 | Wolfe et al. | |
| 2009/0106550 A1 | 4/2009 | Mohamed | |
| 2012/0170743 A1 | 7/2012 | Senese et al. | |
| 2015/0244684 A1* | 8/2015 | Ng | H04L 67/10 |
| | | | 713/168 |
| 2016/0021529 A1* | 1/2016 | Park | H04W 12/08 |
| | | | 455/410 |
| 2018/0034913 A1* | 2/2018 | Matthieu | H04L 67/125 |

* cited by examiner

ESTABLISHING SECURE COMMUNICATION OVER AN INTERNET OF THINGS (IOT) NETWORK

CROSS-REFERENCE TO RELATED APPLICATIONS

This application claims the benefit of U.S. Provisional Patent Application No. 62/490,019, filed on Apr. 25, 2017, the entire content of which is hereby incorporated by reference.

TECHNICAL FIELD

The present disclosure relates generally to communication systems, more particularly the present disclosure provides methods, systems and computer program products for establishing secure communication over an Internet of Things (IoT) network.

BACKGROUND

In an Internet of Things (IoT) network, a variety of electronic and computing devices are interconnected and enabled to communicate with one another. A large number of such devices implemented using IoT network are designed to operate remotely and/or autonomously, without direct human intervention. The advancement in the field of IoT has tremendously increased rate of exchange of data between various devices, thereby making security of IoT network an important concern. The security can be related to preventing unauthorized access that may inject viruses, worms and other malicious data into the IoT network.

The security problem associated with IoT network embedded using the Internet is very challenging. A loosely connected network of IoT devices comprising server, mobile platform, and remote sensor is usually bereft of an enterprise level firewall protection and thus, is prone to malicious attacks. Further, a simple low cost computing device such as a sensor or an actuator cannot handle sophisticated communication protocols offering data transmission safeguards that are implemented in more sophisticated computer network. Also, remote unattended devices are subjected to phishing, physical attack to disable or replace, or hacking.

Therefore, there is a need in the art to provide effective and more secure techniques of communication among various devices implemented in an IoT network.

SUMMARY

Embodiments of the present disclosure provide methods, systems and computer program products for establishing secure communication over an Internet of Things (IoT) network.

According to an aspect of the present disclosure, a method includes performing, by one or more processors of at least one host entity of the one or more host entities implemented in a network: storing plurality of device identifiers, each device identifier corresponding to one of plurality of devices connected in the network to allow access and to share information between the plurality of devices, said plurality of devices comprising the one or more host entities, one or more client entities and one or more key servers; storing an association between one or more devices of the plurality of devices, the association being represented as pairing of device identifiers corresponding to the one or more devices connected to over a communication link in the network; in response to an encryption key request by the at least one host entity to a key server selected from the one or more key servers, receiving an encryption key generated by the key server and a key identifier associated with said encryption key; generating a header comprising an information identifier associated with an information to be protected, the device identifier corresponding to the key server and the key identifier associated with the encryption key; encrypting said information using said encryption key and associating the header with the encrypted information; transmitting said encrypted information and the associated header to at least one receiving entity, the at least one receiving entity being selected from the one or more host entities and the one or more client entities connected to the at least one host entity over a communication link; and transmitting an authorization information indicating a set of receiving entities authorized to access the information, said key identifier, and said header to the key server.

In an embodiment, on receiving the encryption key request from the at least one host entity, the key server generates a key pair comprising the encryption key and a decryption key, assigns the key identifier to the encryption key and transmits said encryption key and said key identifier to the at least one host entity.

In an embodiment, on transmission of said authorization information, said key identifier, and said header to the key server, the key server stores the authorization information, the device identifier of the at least one host entity and the header as a record in a database.

In an embodiment, on transmission of said encrypted information and the associated header to the at least one receiving entity, the at least one receiving entity: extracts, the key identifier and the device identifier corresponding to the key server from the header; requests, the key server, for the decryption key by transmitting the key identifier to said key server; in response to determination that the at least one receiving entity is authorized to access the encrypted information, receives the decryption key from the key server; and decrypts the encrypted information using the received decryption key.

In an embodiment, the determination that the at least one receiving entity is authorized to access the information is performed by the key server, by matching a record corresponding to the key identifier and verifying authorization from authorization information associated with the matched record.

In an embodiment, the authorization information further authorizes at least one client entity of the one or more client entities to transmit information to the at least one host entity. The at least one client entity transmits the information on receiving a control message from the at least one host entity.

In an embodiment, the authorization information is in form of a matrix comprising the device identifier of each receiving entity of the set of receiving entities authorized to access the information.

In an embodiment, the matrix further comprises conditional authorization information including a threshold for number of times each receiving entity of the set of receiving entities can make the request and time period for which the each receiving entity of the set of receiving entities can make the request.

In an embodiment, the at least one receiving entity receives the decryption key on verification of conditional authorization information.

In an embodiment, the key pair is generated using any of an asymmetrical key scheme or a symmetrical key scheme.

In an embodiment, the one or more client entities is selected from a position sensor, a motion sensor, a location sensor, an environmental sensor, or an electro-optical actuator.

According to another aspect of the present disclosure, a system comprises one or more processors of at least one host entity of the one or more host entities implemented in a network; and a memory coupled to the one or more processors and comprising computer readable program code embodied in the memory that is executable by the processor to perform: storing plurality of device identifiers, each device identifier corresponding to one of plurality of devices connected in the network to allow access and to share information between the plurality of devices, said plurality of devices comprising the one or more host entities, one or more client entities and one or more key servers; storing an association between one or more devices of the plurality of devices, the association being represented as pairing of device identifiers corresponding to the one or more devices connected to over a communication link in the network; in response to an encryption key request by the at least one host entity to a key server selected from the one or more key servers, receiving an encryption key generated by the key server and a key identifier associated with said encryption key; generating a header comprising an information identifier associated with an information to be protected, the device identifier corresponding to the key server and the key identifier associated with the encryption key; encrypting said information using said encryption key and associating the header with the encrypted information; transmitting said encrypted information and the associated header to at least one receiving entity, the at least one receiving entity being selected from the one or more host entities and the one or more client entities connected to the at least one host entity over a communication link; and transmitting an authorization information indicating a set of receiving entities authorized to access the information, said key identifier, and said header to the key server.

According to yet another aspect of the present disclosure, a computer program product, comprises a non-transitory computer readable storage medium comprising computer readable program code embodied in the medium that is executable by one or more processors of at least one host entity of one or more host entities implemented in a network to perform: storing plurality of device identifiers, each device identifier corresponding to one of plurality of devices connected in the network to allow access and to share information between the plurality of devices, said plurality of devices comprising the one or more host entities, one or more client entities and one or more key servers; storing an association between one or more devices of the plurality of devices, the association being represented as pairing of device identifiers corresponding to the one or more devices connected to over a communication link in the network; in response to an encryption key request by the at least one host entity to a key server selected from the one or more key servers, receiving an encryption key generated by the key server and a key identifier associated with said encryption key; generating a header comprising an information identifier associated with an information to be protected, the device identifier corresponding to the key server and the key identifier associated with the encryption key; encrypting said information using said encryption key and associating the header with the encrypted information; transmitting said encrypted information and the associated header to at least one receiving entity, the at least one receiving entity being selected from the one or more host entities and the one or more client entities connected to the at least one host entity over a communication link; and transmitting an authorization information indicating a set of receiving entities authorized to access the information, said key identifier, and said header to the key server.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
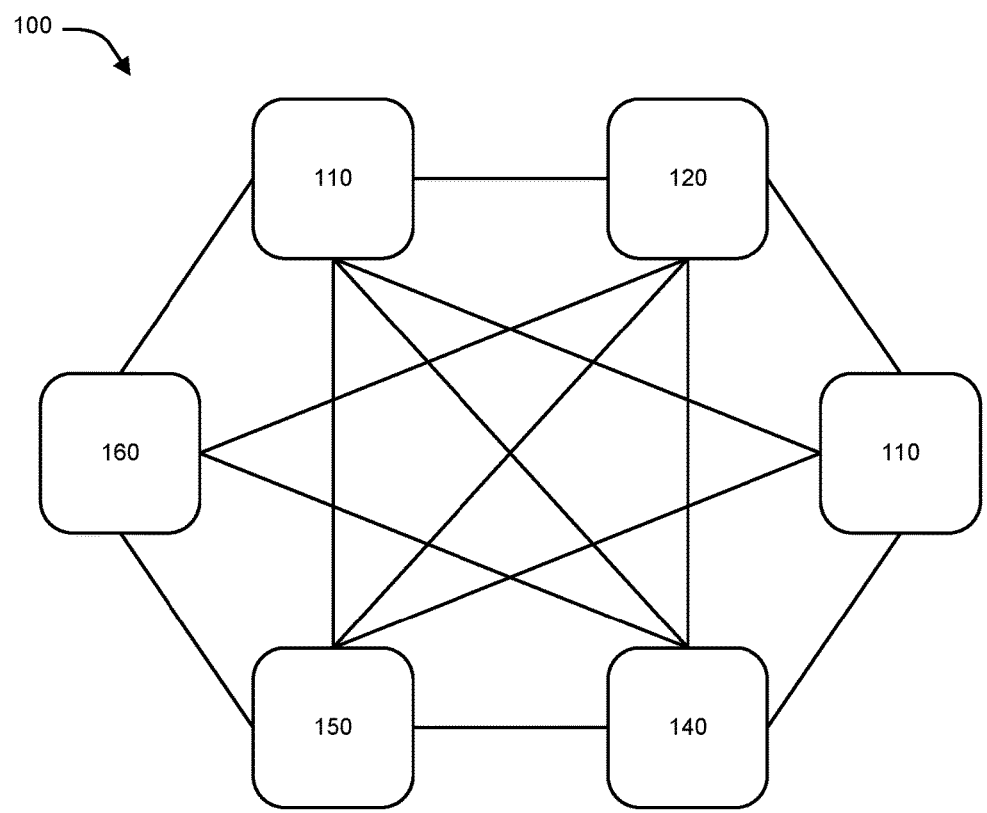
FIG. 1 illustrates an exemplary architecture of an ideal IoT network in accordance with an embodiment of the present disclosure.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

Embodiments of the present disclosure provide methods, systems and computer program products for establishing secure communication over an Internet of Things (IoT) network.

According to an aspect of the present disclosure, a method includes performing, by one or more processors of at least one host entity of the one or more host entities implemented in a network: storing plurality of device identifiers, each device identifier corresponding to one of plurality of devices connected in the network to allow access and to share information between the plurality of devices, said plurality of devices comprising the one or more host entities, one or more client entities and one or more key servers; storing an association between one or more devices of the plurality of devices, the association being represented as pairing of device identifiers corresponding to the one or more devices connected to over a communication link in the network; in response to an encryption key request by the at least one host entity to a key server selected from the one or more key servers, receiving an encryption key generated by the key server and a key identifier associated with said encryption key; generating a header comprising an information identifier associated with an information to be protected, the device identifier corresponding to the key server and the key identifier associated with the encryption key; encrypting said information using said encryption key and associating the header with the encrypted information; transmitting said encrypted information and the associated header to at least one receiving entity, the at least one receiving entity being selected from the one or more host entities and the one or more client entities connected to the at least one host entity over a communication link; and transmitting an authorization information indicating a set of receiving entities authorized to access the information, said key identifier, and said header to the key server.

In an embodiment, on receiving the encryption key request from the at least one host entity, the key server generates a key pair comprising the encryption key and a decryption key, assigns the key identifier to the encryption key and transmits said encryption key and said key identifier to the at least one host entity.

In an embodiment, on transmission of said authorization information, said key identifier, and said header to the key server, the key server stores the authorization information, the device identifier of the at least one host entity and the header as a record in a database.

In an embodiment, on transmission of said encrypted information and the associated header to the at least one receiving entity, the at least one receiving entity: extracts, the key identifier and the device identifier corresponding to the key server from the header; requests, the key server, for the decryption key by transmitting the key identifier to said key server; in response to determination that the at least one receiving entity is authorized to access the encrypted information, receives the decryption key from the key server; and decrypts the encrypted information using the received decryption key.

In an embodiment, the determination that the at least one receiving entity is authorized to access the information is performed by the key server, by matching a record corresponding to the key identifier and verifying authorization from authorization information associated with the matched record.

In an embodiment, the authorization information further authorizes at least one client entity of the one or more client entities to transmit information to the at least one host entity. The at least one client entity transmits the information on receiving a control message from the at least one host entity.

In an embodiment, the authorization information is in form of a matrix comprising the device identifier of each receiving entity of the set of receiving entities authorized to access the information.

In an embodiment, the matrix further comprises conditional authorization information including a threshold for number of times each receiving entity of the set of receiving entities can make the request and time period for which the each receiving entity of the set of receiving entities can make the request.

In an embodiment, the at least one receiving entity receives the decryption key on verification of conditional authorization information.

In an embodiment, the key pair is generated using any of an asymmetrical key scheme or a symmetrical key scheme.

In an embodiment, the one or more client entities is selected from a position sensor, a motion sensor, a location sensor, an environmental sensor, or an electro-optical actuator.

According to another aspect of the present disclosure, a system comprises one or more processors of at least one host entity of the one or more host entities implemented in a network; and a memory coupled to the one or more processors and comprising computer readable program code embodied in the memory that is executable by the processor to perform: storing plurality of device identifiers, each device identifier corresponding to one of plurality of devices connected in the network to allow access and to share information between the plurality of devices, said plurality of devices comprising the one or more host entities, one or more client entities and one or more key servers; storing an association between one or more devices of the plurality of devices, the association being represented as pairing of device identifiers corresponding to the one or more devices connected to over a communication link in the network; in response to an encryption key request by the at least one host entity to a key server selected from the one or more key servers, receiving an encryption key generated by the key server and a key identifier associated with said encryption key; generating a header comprising an information identifier associated with an information to be protected, the device identifier corresponding to the key server and the key identifier associated with the encryption key; encrypting said information using said encryption key and associating the header with the encrypted information; transmitting said encrypted information and the associated header to at least one receiving entity, the at least one receiving entity being selected from the one or more host entities and the one or more client entities connected to the at least one host entity over a communication link; and transmitting an authorization information indicating a set of receiving entities authorized to access the information, said key identifier, and said header to the key server.

According to yet another aspect of the present disclosure, a computer program product, comprises a non-transitory computer readable storage medium comprising computer readable program code embodied in the medium that is executable by one or more processors of at least one host entity of one or more host entities implemented in a network to perform: storing plurality of device identifiers, each device identifier corresponding to one of plurality of devices connected in the network to allow access and to share information between the plurality of devices, said plurality of devices comprising the one or more host entities, one or more client entities and one or more key servers; storing an association between one or more devices of the plurality of devices, the association being represented as pairing of device identifiers corresponding to the one or more devices connected to over a communication link in the network; in response to an encryption key request by the at least one host entity to a key server selected from the one or more key servers, receiving an encryption key generated by the key server and a key identifier associated with said encryption key; generating a header comprising an information identifier associated with an information to be protected, the device identifier corresponding to the key server and the key identifier associated with the encryption key; encrypting said information using said encryption key and associating the header with the encrypted information; transmitting said encrypted information and the associated header to at least one receiving entity, the at least one receiving entity being selected from the one or more host entities and the one or more client entities connected to the at least one host entity over a communication link; and transmitting an authorization information indicating a set of receiving entities authorized to access the information, said key identifier, and said header to the key server.

FIG. 1 illustrates an exemplary architecture of an ideal IoT network in accordance with an embodiment of the present disclosure.

Referring to FIG. 1, in an exemplary architecture of an IoT network, a plurality of electronic and computing devices such as mobile devices, personal computers, cloud computing platforms, smart physical sensors, smart actuators and the likes can be connected with each other. For example, as illustrated, computing devices 110 to 160 can be all connected with one another to form a network 100. The network 100 can either be a standalone network or can form a part of network embedded in one of the different types of networks, such as Intranet, Local Area Network (LAN), Wide Area Network (WAN), Internet, and the like. Further, the network 100 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like.

Those skilled in the art would appreciate that in a network of N computing device, maximum number of allowed connections is N(N−1)/2. Thus, the network 100 comprising 6 devices can have a maximum of 15 connections. Also, for a network comprising large number of devices, the maximum number of connections can be approximated to N*N/2. Though, the number of possible connections can be much more than number of devices in the network, however, in practical implementation, the number of inter-connections within the network are much less as the devices are generally arranged in a hierarchical topology where one or more host entities can control controls a plurality of client entities.

Figure 2:
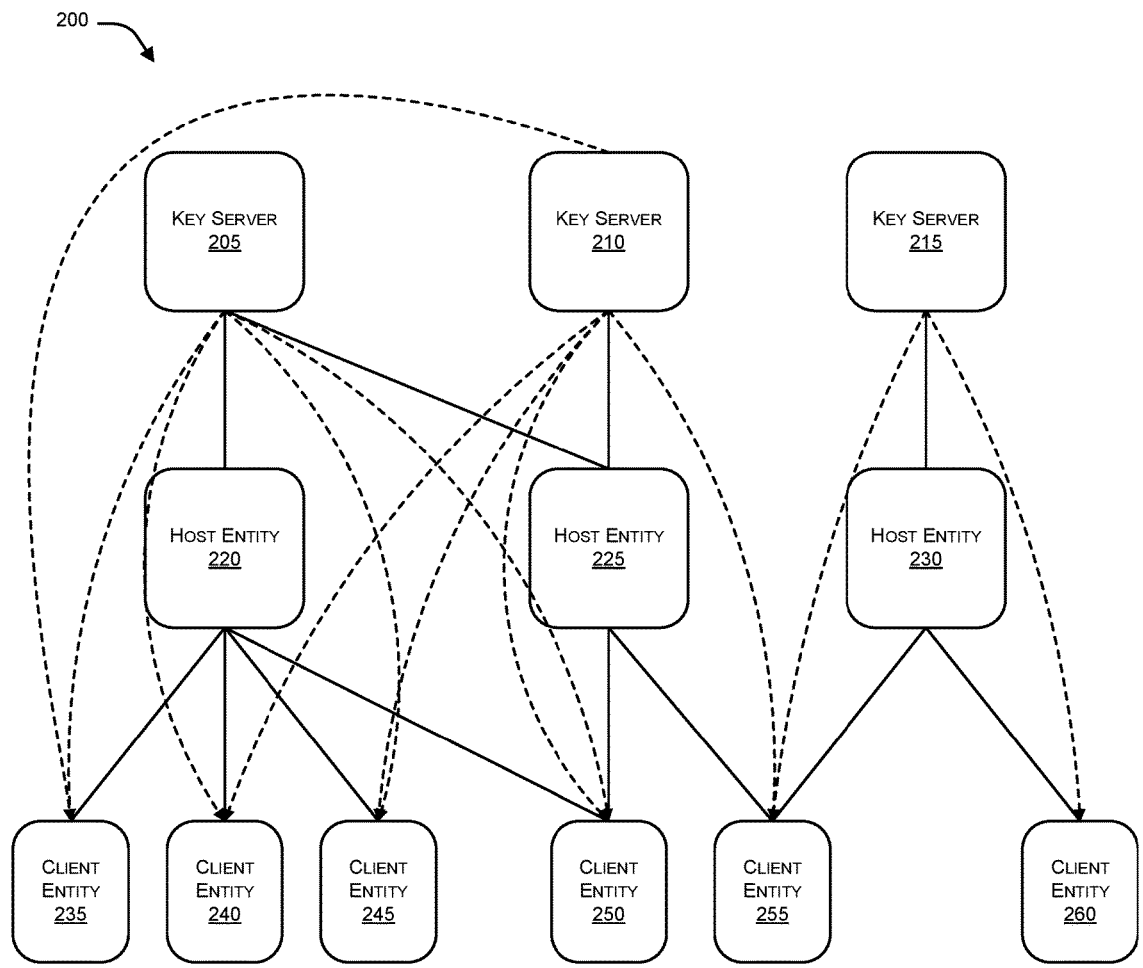
FIG. 2 illustrates an exemplary hierarchical topology of an IoT network according to an embodiment of the present disclosure.

FIG. 2 illustrates an exemplary hierarchical topology of an IoT network according to an embodiment of the present disclosure.

Referring now to FIG. 2, computing devices of an exemplary network 200 can be categorized into three categories i.e. key servers 205, 210 and 215, host entities 220, 225 and 230 and client entities 235, 240, 245, 250, 255 and 260. Said categories can be based on respective functionalities of the devices connected in the network 200.

In an embodiment, the key servers 205, 210 and 215 can generate security keys such as encryption and decryption keys in and can store said keys in respective database. The key server 205, 210 and 215 can be standalone security servers in the network 200, security servers can be embedded in any device in the network 200, remote computer nodes outside the network 200 or virtual machines residing in outside the devices, such as cloud storage.

The host entities 220, 225 and 230 can be computing devices such as portable computers, personal digital assistants, handheld devices, workstations, etc that can possess sufficient processing power and memory and can be operatively coupled with a User Interface (UI) to allow human interaction. In alternative embodiment, the host entities can be Virtual Machine (VM) devices that can be located in a cloud platform. Further, the client entities 235, 240, 245, 250, 255 and 260 can be devices with limited computing power and memory and can be controlled by the host entities 220, 225 and 230. Thus, client entities 235, 240, 245, 250, 255 and 260 may not require a UI.

In an embodiment, the client entities 235, 240, 245, 250, 255 and 260 can be capable of reporting position. In an example, position data from a sensor can be combined with a time stamp to track movement of a client entity. Further, an embedded multi-axis accelerometer can provide more information on nature of the motion. Furthermore, a Global Positioning System (GPS) can provide outdoor position, and Real Time Location System (RTLS) can provide real time indoor location/position.

In another embodiment, the client entities 235, 240, 245, 250, 255 and 260 can be equipped with a wide variety of environmental sensors to cover various types of spectrums such as audio, video, electro-magnetic, etc. Further, data from the client entities 235, 240, 245, 250, 255 and 260 can be streamed to the host entities 220, 225 and 230 for analysis and storage. The host entities 220, 225 and 230 can take actionable decisions based on analysis of the data derived from the client entities 235, 240, 245, 250, 255 and 260.

In yet another embodiment, the client entities 235, 240, 245, 250, 255 and 260 can be equipped with electromechanical or electro-optical actuators to perform practical physical actions. For example, in households, said actuators can be used for controlling switching of lighting devices, air conditioners, and other appliances. In industrial units, the client entities 235, 240, 245, 250, 255 and 260 can be actuators embedded in a plurality of robots or robotics arms that can be controlled to minimize human operations.

In another embodiment, the client entities 235, 240, 245, 250, 255 and 260 can be disposable after performing a designed function for a fix time period. For example, in medical equipments disposable sensors can be used for extended monitoring or situations where risk of cross-contamination is high. Further, client entities 235, 240, 245, 250, 255 and 260 can be configured with plurality of sensors and actuators to enable a variety of tasks by a single device.

The devices of the network 200 can be capable of continuously transmitting information with one another. The information can be defined in most general sense to include control message between devices, i.e. computer instructions, and any form of digitized data, routine operation of the network 200.

Those skilled in the art would appreciate that the key servers 205, 210 and 215, the host entities 220,225 and 230 and the client entities 235, 240, 245, 250, 255 and 260 can be virtualized generic devices that can represent a wide variety of computing, sensory and actuator devices. In an embodiment, one device can be categorized into different type in different configuration. For example, a mobile device can operate as a host entity in one network configuration, can operate as a key server in another configuration, and can operate as a client entity in yet another configuration. Further, in another embodiment multiple functions can be combined in a single device. For example, a computing device can operate as an integrated key server and host entity. Furthermore, embodiments of the present disclosure provides a flexibility to allow the network 200 to reconfigure itself during its operating life such that the technique for establishing a secure communication can be adapted in different network configurations.

According to an embodiment, in practical implementation the number of connections in the network 200 would be much less than maximum possible connections. As illustrated, in an exemplary architecture the host entities 220 and 225 can access the key servers 205 and 210. The host entity 230 can be connected to the only one key server 215, having no access to the key servers 205 and 210. Each of the host entities 220, 225 and 230 can control plurality of client entities 235, 240, 245, 250, 255 and 260. The host entity 220 can control the client entities 235, 240, 245 and 250. The host entity 225 can control the client entities 250, 255 and 260. The host entity 230 can control the client entities 255 and 260. The client entities 245 and 250 can be shared and controlled by both the host entities 220 and 225. Likewise, the client entity 255 can be connected to and controlled by the host entities 225 and 230, while the client entity 260 can be solely controlled by the host entity 230. Those skilled in the art would appreciate that the network configuration can be extended to an arbitrary number of key servers and host entities, and a plurality of host entities can share control of a single client entity.

According to an embodiment, the key servers 205, 210 and 215 can serve security keys to the host entities 220, 225 and 230 and connected client entities 235, 240, 245, 250, 255 and 260. Any information can be encrypted by an encryption key before transmission, and decrypted at a destination by a decryption key from the same key server. A host entity can request a key only from connected key server. For example, the host entity 230 can only request a key from the key server 215. In an alternate embodiment, the network can include a single key server that can provide key to all connected host entities. In an aspect, a client entity can only request a key from the key server connected to its controlling host. For example, the client entity 235 can be controlled by the host entity 220, which in turn is connected to the key server 205 and 210. Therefore, the client entity 235 can request a key from both the key servers 205 and 210, and not from the key server 215.

In an embodiment, when the client entity 235 requests a key, the request can be sent to the key server 205 through the host entity 220, and the key can be served using the same the key server 205 through the host entity 220, therefore a need for a separate connection between the client entity 235 and the key server 205 can be integrated with the host entity 220.

Figure 3:
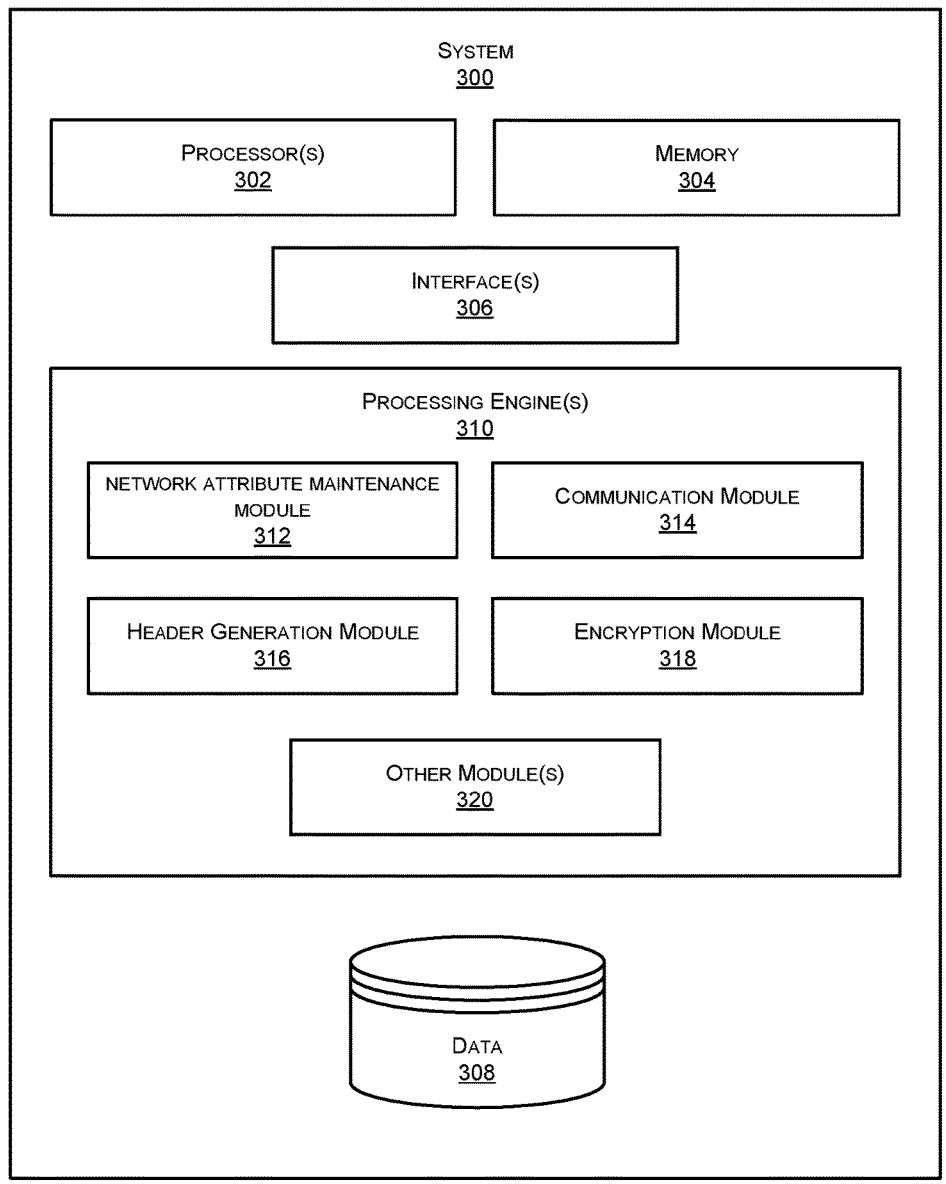
FIG. 3 is a module diagram illustrating functional units of a system to enable secure communication within an IoT network in accordance with an embodiment of the present invention.

FIG. 3 is a module diagram illustrating functional units of a system to enable secure communication within an IoT network in accordance with an embodiment of the present invention.

As illustrated, the system 300, which may represent a host entity, can include one or more processor(s) 302. The one or more processor(s) 302 can be implemented as one or more microprocessors, microcomputers, microcontrollers, digital signal processors, central processing units, logic circuitries, and/or any devices that manipulate data based on operational instructions. Among other capabilities, the one or more processor(s) 302 are configured to fetch and execute computer-readable instructions stored in a memory 304 of the system 300. The memory 304 can store one or more computer-readable instructions or routines, which may be fetched and executed to create or share the data units over a network service. The memory 304 can include any non-transitory storage device including, for example, volatile memory such as RAM, or non-volatile memory such as EPROM, flash memory, and the like. In an example embodiment, the memory 304 may be a local memory or may be located remotely, such as a server, a file server, a data server, and the Cloud.

The system 300 can also include an interface(s) 306. The interface(s) 306 may include a variety of interfaces, for example, interfaces for data input and output devices, referred to as I/O devices, storage devices, and the like. The interface(s) 306 may facilitate communication of the system 300 with various devices coupled to the system 300. The interface(s) 306 may also provide a communication pathway for one or more components of the system 300. Examples of such components include, but are not limited to, processing engine(s) 310 and data 308.

The engine(s) 310 can be implemented as a combination of hardware and software or firmware programming (for example, programmable instructions) to implement one or more functionalities of the engine(s) 310. In examples described herein, such combinations of hardware and software or firmware programming may be implemented in several different ways. For example, the programming for the engine(s) may be processor executable instructions stored on a non-transitory machine-readable storage medium and the hardware for the engine(s) 310 may include a processing resource (for example, one or more processors), to execute such instructions. In the examples, the machine-readable storage medium may store instructions that, when executed by the processing resource, implement the engine(s) 310. In such examples, the system 300 can include the machine-readable storage medium storing the instructions and the processing resource to execute the instructions, or the machine-readable storage medium may be separate but accessible to system 300 and the processing resource. In other examples, the engine(s) 310 may be implemented by electronic circuitry. The data 308 can include data that is either stored or generated as a result of functionalities implemented by any of the components of the engine(s) 310.

In an example, the processing engine(s) 310 can include a network attribute maintenance module 312, a communication module 314, a header generation module 316, an encryption module 318 and other module(s) 320. The other module(s) 320 can implement functionalities that supplement applications or functions performed by the system 300 or the processing engine(s) 310.

In an embodiment, the system 300 can be implemented in a host entity. The network attribute maintenance module 312 can define the extent and the boundary of the network. In an implementation of the network, an application can be configured in every device of the network. The application can be a simple program containing a pre-defined Application programming interface (API) that instructs all the devices in the network how to implement communications between devices.

The can network attribute maintenance module 312 enable storage of device identifiers of all devices including the key servers, the host entities and the client entities that are connected in a network. Further, the network attribute maintenance module 312 can also enable storage of association between various devices of the network that can completely specify interaction among the devices of the network. The association can be stored in the form of pairing of device identifiers corresponding to the devices connected to over a communication link.

In an example, referring to FIG. 2, the network attribute maintenance module 312 can enable storage of:
a. The device identifiers of key servers 205, 210 and 215;
b. The device identifiers of host entities 220, 225 and 230;
c. The device identifiers of one or a plurality of key servers assigned to each host entity. Host entity 220 has assigned key servers 205 and 210. Host entity 225 has assigned key servers 205 and 210. Host entity 230 has only one assigned key server 215;
d. The device identifiers of client entities 235, 240, 245, 250, 255 and 260; and
e. The device identifiers of one or a plurality of host entities the assigned client entities. For example, clients 235, 240, 245 and 250 are assigned to host entity 220, client entities 250 and 255 are assigned to host entity 225, and client entities 255 and 260 are assigned to host entity 230. Thus client entity 250 is shared by two host entities 220 and 225, and client entity 255 is shared by host entities 225 and 230;

In an embodiment, the network attribute maintenance module 312 can enable storage of device identifiers and association of various devices in form of pairing of device identifiers in a config file that can be created using a user generated information and can be editable IoT config file by the user. In an implementation, the attributes of the network or the config file can be provided by the network administrator during initialization to a host entity and can be immediately provided to every designated key server and every designated host entity of the network using the communication module 214. Likewise, when the attributes of the network are edited and approved by the network administrator, the network operation can be halted, and the edits can be immediately updated to each and every key server and host entity using the communication module 214.

In an embodiment, the key servers of the network can also include a memory in which machine executable instructions can be stored and one or more processors connected to the memory for executing machine executable instructions that can be stored in the memory to carry out a plurality of functions. In an embodiment, the attributes of the network can be defined by any of the key servers of the network and said attributes can be provided to the network attribute maintenance module 312 of the host entities of the network, such that the network attribute maintenance module 312 can enable storage of the attributes in the respective host entity.

Those skilled in the art would appreciate that the network can be reconfigured by updating or editing the attributes of the network or the config file, however, such reconfiguration can be subject to constraints on computing power, UI capability, communication bandwidth and memory capacity of various devices of the network. The reconfiguration can be a physical reconfiguration, e.g. addition or deletion of device, a logical reconfiguration e.g. allowing or disallowing communication between key server to host entity and host entity to client entity, or reconfiguration of a mode of operation of any device e.g. configuring a host entity as a key server or combining a key server and a host entity or adding a client function to a host entity.

In an embodiment, prior to each information or data transmission, the network attribute maintenance module 312 can maintain authorization information indicating receiving entities that are authorized to access the transferred information. The receiving entities can be any host entity or client entity to which information is transferred from the host entity implementing the system 300. For example, the authorization information can be maintained in a matrix that can be generated and updated by the using the network attribute maintenance module 312 of the transmitting host entity. In an implementation, the matrix can be generated once prior to first transmission and can be left unchanged for subsequent transmissions. In another implementation, the contents of the matrix can be changed prior to every transmission of information from the host entity.

Referring to FIG. 2, the matrix generated by the host entity 220 can indicate authorization information by specifying the identifiers of other host entities and client entities in the network that can be allowed to request a decryption key to the information sent by the host entity 220. In the example, the plurality of host and client entities authorized by host entity 220 can maximally include host entity 225, and client entity 235, 240, 245 and 250. However, the matrix generated by the host entity 220 can shortlist one device for a single end to end transmission. Thus, the matrix can confer much flexibility to the host entity 220 to control intended receivers of a transmission. It would be appreciated that, the authorized recipient devices can be constrained by the config file, hence, the host entity 220 can transmit to host entity 225 but not host entity 230 because the config file does not allow a connection between 220 and 230.

In an embodiment, the matrix can further include conditional authorization information such as a threshold for number of times each host entity or client entity can make a request for transmission and access from a key server, time period during which a request for key can be made to a key server, time period after which decrypted information can be erased.

In an embodiment, the client entities that can be controlled by host entity can be stored in a config file, the matrix can further specify when and under what circumstance the client entities can initiate data communication. For example, the matrix can be generated by a controlling host can specify transmission of information or data from client entity when the controlling host entity requires sensor data for analysis or storage. Referring to FIG. 2, the host entity 220 can control client entities 235, 240, 245 and 250. Out of the client entities 235, 240, 245 and 250, the matrix can specify client entities being allowed to transmit data by selectively blocking transmission from certain devices. In an example, when client entity 250 is paired with host entities 220 and 225 according to the config file, but the matrix generated by host entity 220 can further specify that client 250 can transmit data to host entity 220 only, or to host entity 225 only, or to both host entities 220 and 225.

In an embodiment, the matrix can further specify conditional authorization information for transmission of information from a client entity to the designated host entity. For example, said authorization information can include a threshold number of times the client's designated host entity can make a request for the client to transmit data, time period for which the host entity can receive data from the client entity.

In an embodiment, prior to transmission of information from the host entity, the host entity can request an encryption key from a key server using the communication module 314. The key server can be selected from one or more key servers configured in the network. For example, referring to FIG. 2, the transmitting host entity is 230 can request an encryption key from the sole assigned key server 215, on the other hand, if the transmitting host entity is 220, it can request the encryption key either from key server 205, or from key server 210. In an embodiment, the key server that provides the encryption key can be selected based on security policy of the network and may depend on network considerations such as load balancing of the key servers, immediate availability of the key server, etc. Thus, out of the multiple key servers that can serve encryption key to a requesting host entity at any given time, the selection of the key server can be determined based on the network policy.

In an embodiment, on receiving the request from the communication module 314 of the system 300, the key server can generate a key pair that can include an encryption key and a decryption key. The key server can also generate a key identifier and can associate said key identifier with the encryption key such that the key identifier and the encryption key can be provided to the system 300 through the communication module 314.

In an embodiment, on receiving said encryption key and said key identifier, the header generation module 316 can generate a header that can include an information identifier that can be a random file ID associated with information to be protected before transmission, the key identifier, and device identifier of the key server that provides the encryption key. The header can also include other parameters such as time and date of encryption, GPS location of the key server, the internet protocol address of the key server 210 or 220, etc.

In an embodiment, the encryption module 318 can encrypt the information that is required to be protected before transmission. The encryption module 318 can encrypt the information using the received encryption key and can associate the generated header to the encrypted information. Additionally, the encryption module 318 can generate a hash for the information before performing the encryption. This technique would be useful in verifying the integrity of the information that would be received by the receiving entity.

In an embodiment, the communication module 314 can transmit the encrypted information along with associated header to the receiving entity that is intended to receive the information. Further, the communication module 314 can transmit the authorization information in the form of matrix, the key identifier associated with the encryption key and the generated header to the key sever.

As mentioned above, the key server can also include a memory in which machine executable instructions can be stored and one or more processors connected to the memory for executing machine executable instructions that can be stored in the memory to carry out a plurality of functions. In an embodiment, on receiving the request for the encryption key the key server can generate a key pair including an encryption key and a decryption key and can associate a key identifier with said key pair, such that, on receiving the request the key server can transmit the encryption key and the associated key identifier back to the host entity. It would be appreciated that the key server can utilize a suitable technique known in the art for generation of the key pair. In an example, an asymmetric key scheme such as RSA scheme or an elliptical key scheme can be employed that generates a key pair comprising an encryption key and a decryption key that are connected by a mathematical relationship. In another example, a symmetrical key scheme can be employed in which a single key can perform both encryption and decryption operation. Thus, the encryption key and the decryption key of the key pair would be same.

In an embodiment, on receiving the authorization information in the form of matrix, the key identifier associated with the encryption key and the header generated by the header generation module 316 of the system 300 of the host entity, the key sever can bind the device identifier of the host entity with header and the matrix and can store said combined device identifier of the host entity, the matrix and the header as a key record in a database that can be operatively coupled with the key server.

In an embodiment, on transmission of the encrypted information and the associated header to the receiving entity by the communication module 314, the receiving entity extracts the key identifier and the device identifier corresponding to the key server from the received header. Further, the receiving entity can request the key server, identified through the device identifier obtained from the header, for decryption key. The request for the decryption key can be made using by transmitting the key identifier to said key server. Further, the key server can then determine whether the client entity is authorized to access the information or not using the matrix. Also, in response to determination that the client entity is authorized to access the encrypted information, the receiving entity can receive the decryption key from the key server and can decrypt the encrypted information using the received decryption key and the received header. The process of decryption by the receiving entity is further elaborated with reference to FIG. 7.

Figure 4A:
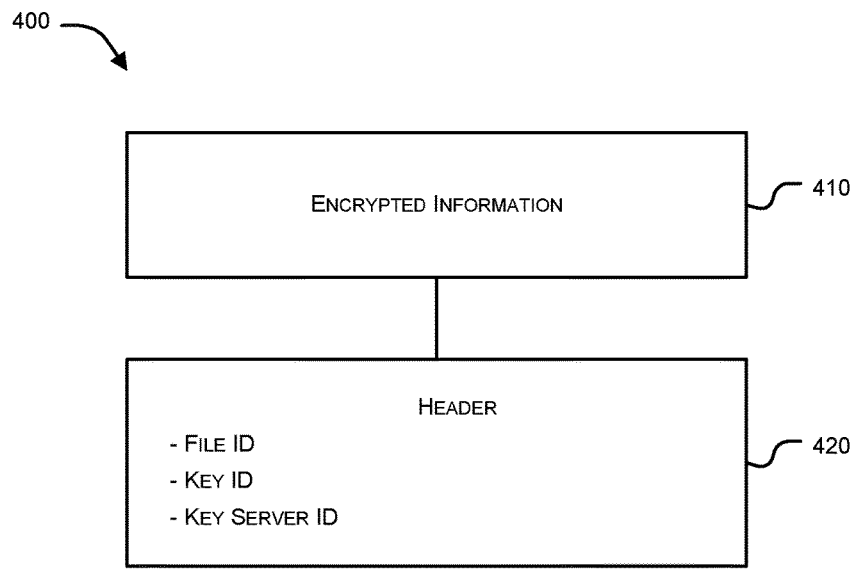
FIG. 4A illustrates an exemplary header generated by a host entity in accordance with an embodiment of the present disclosure.

FIG. 4A illustrates an exemplary header generated by a host entity in accordance with an embodiment of the present disclosure.

In an aspect, the encrypted information 410 can be associated with a header 420. The header can contain an information identifier represented by file ID and a key identifier represented by key ID, both of which can be randomly generated and thus be mathematically unique. In addition, the header 420 can include device identifier of the key server i.e. the key server ID that can be utilized to trace the key server by the receiving entity.

Figure 4B:
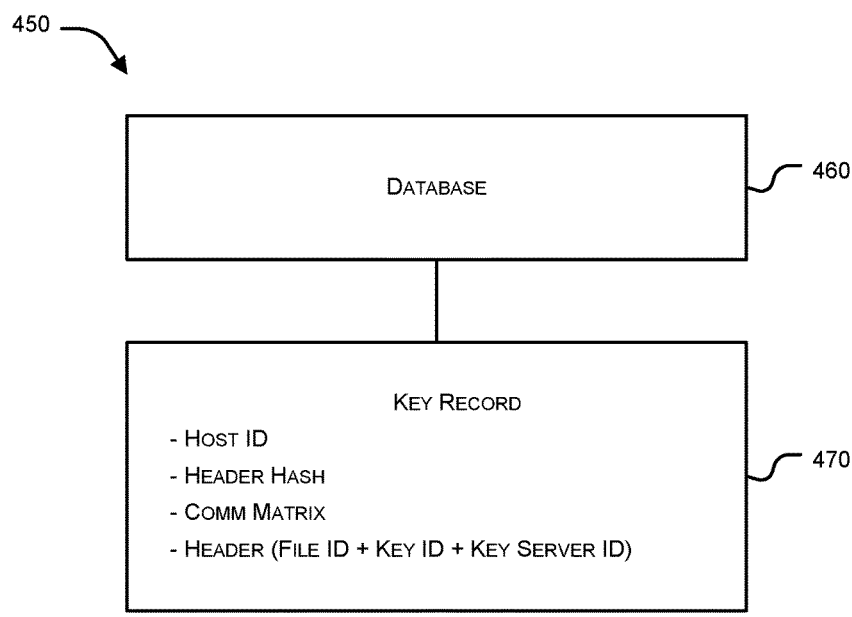
FIG. 4B illustrates an exemplary key record stored in database of the key server in accordance with an embodiment of the present disclosure.

FIG. 4B illustrates an exemplary key record stored in database of the key server in accordance with an embodiment of the present disclosure.

In an embodiment, the key server can include a database 460 to store records that can be utilized for transmission of information. An exemplary key record 470 can include device identifier of the host entity transmitting the information represented by Host ID, hash of the header generated by the host entity and transmitted to the key server represented by header hash, association information provided by the host entity represent by matrix and header generated by the host entity. The plurality of key records stored in the database can provide a complete history of how information is generated, manipulated and operated upon by various devices within the network. In an embodiment, Big Data Analytics can be applied to data from the databases of the various key servers wherein the time history of key serving, and the history of all the matrices can be provided as an input to Big Data Analytics to evaluate efficiency of the network.

Figure 5A:
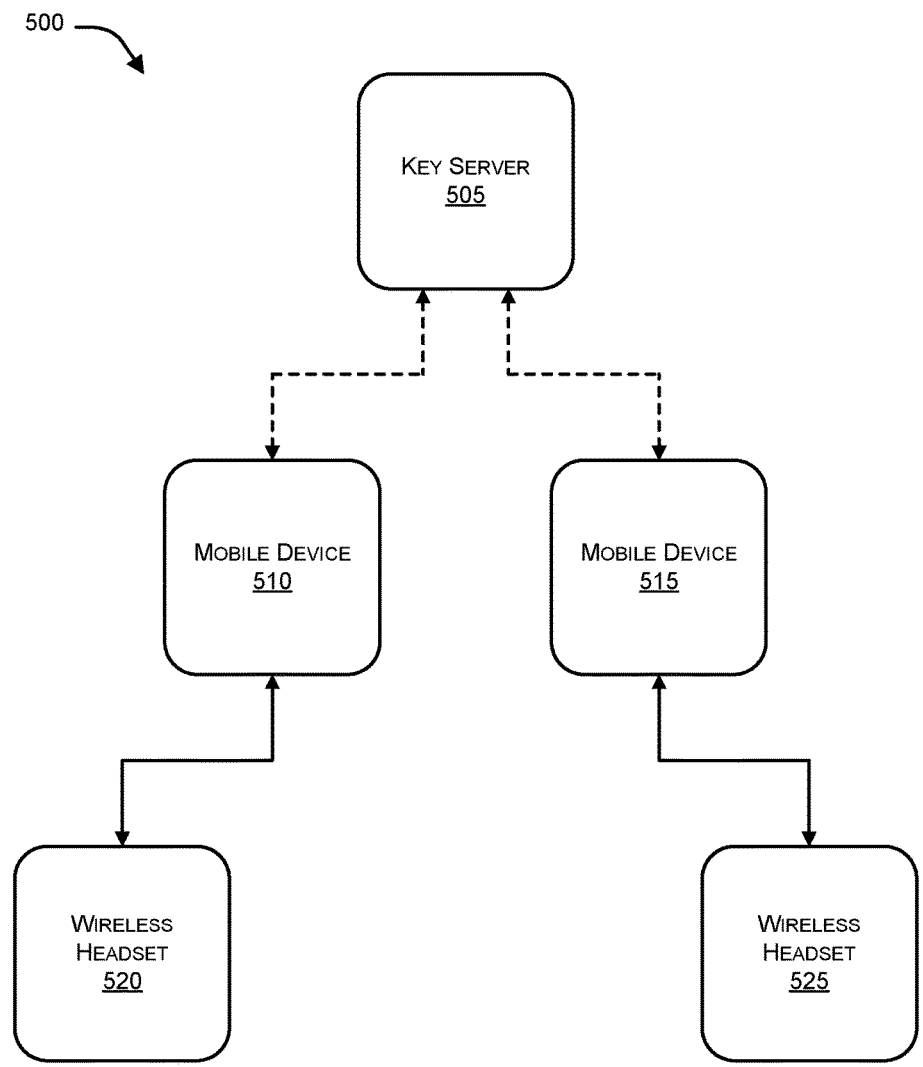
FIGS. 5A-B illustrate an examples of network architectures implementing the system in accordance with an embodiment of the present disclosure.
Figure 5B:
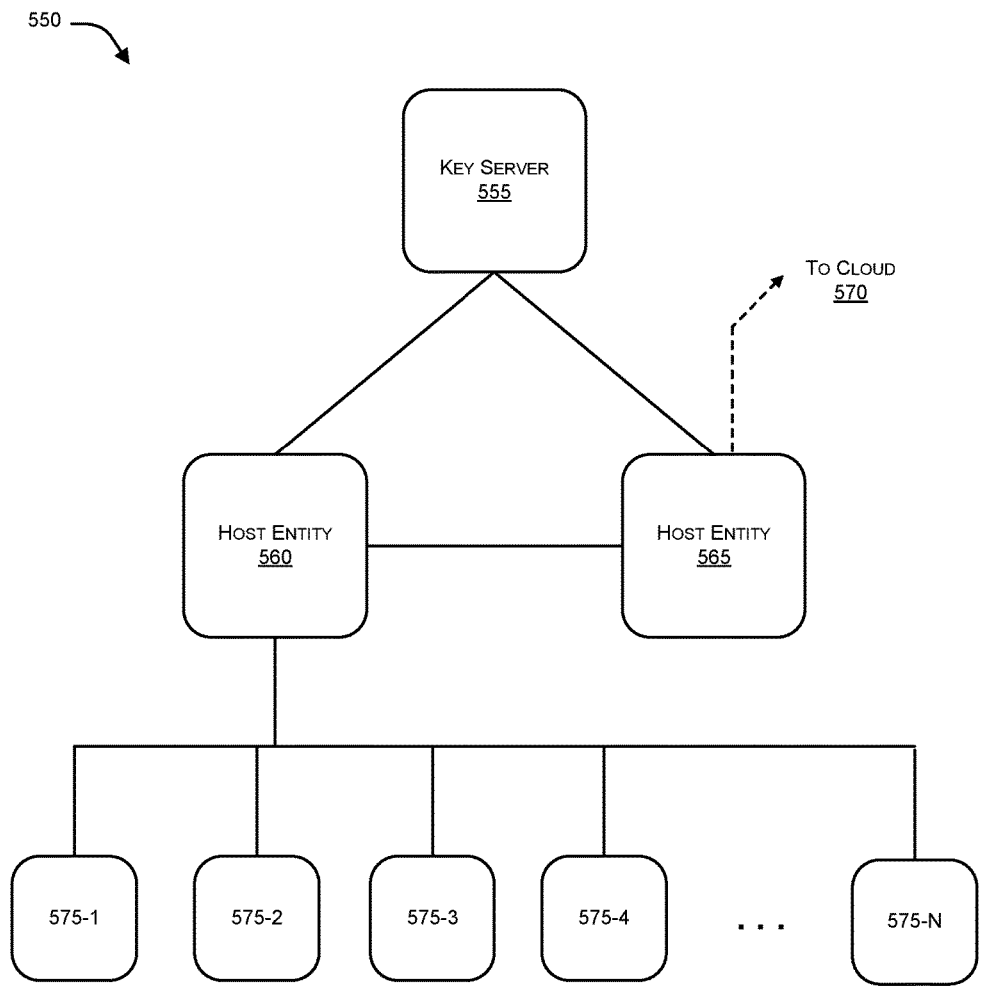

FIGS. 5A-B illustrate an examples of network architectures implementing the system in accordance with an embodiment of the present disclosure.

FIG. 5A illustrates an exemplary implementation of the system in mobile devices to establish secure communication in accordance with an embodiment of the present disclosure. In an embodiment, the network 500 can be utilized to allow secure telephonic communication between two users. The network 500 can include a key server 505, two mobile devices 510 and 515 that can be operated as host entities, and two wireless headsets 520 and 525 that can be operated as client entities. The wireless headsets can be used by the users for speaking and listening. When a first user speaks into headset 520, voice data can be converted in to digital Pulse Code Modulation (PCM) in situ in 520. The mobile device 510 can request the encryption key from the key server 510 to encrypt the voice file and can erase the clear text voice file. The encrypted voice file can be transmitted to the mobile device 515. The receiving mobile phone 515 can receive the encrypted voice file, and sends it wirelessly to the wireless headphone 525. The wireless headphone 525 can request a decryption key from key server 505 and can decrypt the voice file and can play it to the user of mobile phone 515. This process can be repeated to allow a secure conversation. For the purpose of record, only encrypted information can be stored and unencrypted text voice files can be erased.

FIG. 5B illustrates an exemplary implementation of the system for controlling of a plurality of sensors in accordance with an embodiment of the present disclosure. In an exemplary embodiment, host entity 560 can be a home gateway that can access, control and collect data from a plurality of sensors and actuators 575-1, 575-2, . . . , 575-N that can be installed within residence of a user. The sensors and actuators 575-1, 575-2, . . . , 575-N can be the client entities that can receive command from the host entity 560. In an aspect, sensor collected data can be routed to and aggregated by the host entity 560. Aggregated data can be sent to the host entity 565 to be subjected to big data analytics. In an embodiment, a cloud platform 570 can store the data sent by 565. It would be appreciated that the data stored in the cloud platform 570 would be in encrypted form, with decryption key stored in the key server 555, thus ensuring security of the stored data. In an aspect, the key server 555 can serve the encryption/decryption keys to the devices and can also be used for archiving operational history of key serving and storage. All keys served to the client entities 575-1, 575-2, . . . , 575-N can be routed through the host entity 560. In an embodiment, sensor data from the client devices can be encrypted before routing to the gateway 560.

Figure 6:
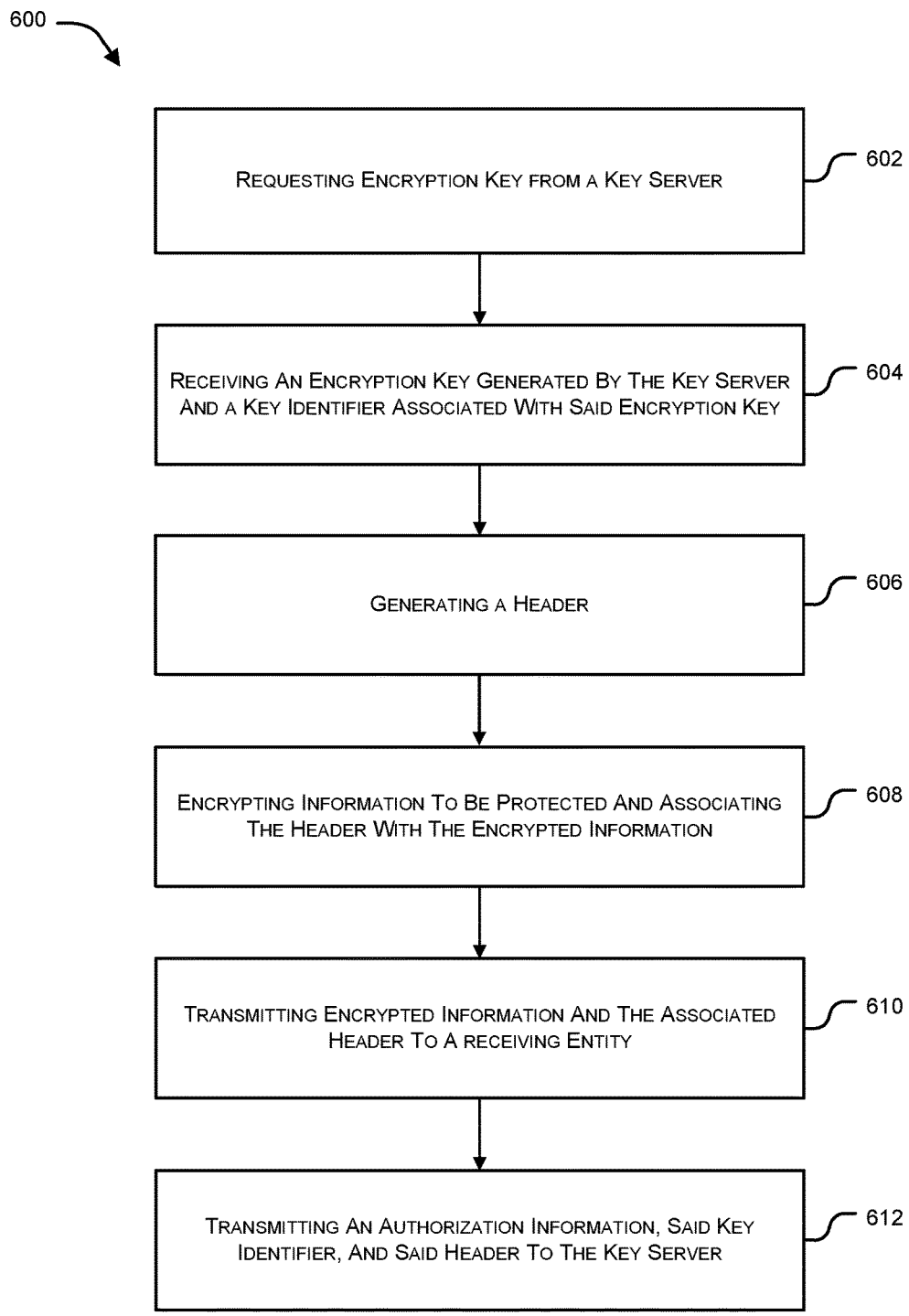
FIG. 6 is a flow diagram illustrating encryption of information at the host entity in accordance with an embodiment of the present disclosure.

FIG. 6 is a flow diagram illustrating encryption of information at the host entity in accordance with an embodiment of the present disclosure.

In an embodiment, the process to encrypt data at the host entity can be initiated at block 602 where the host entity requests an encryption key from a key server. The key server can be selected from one or more key servers connected to the host entity based on security policy of the network. It would be appreciated that, the device identifier of the key server, i.e., the key server ID would be bound to both the encryption key and the encrypted file ensuring that when the receiving device requires to decrypt the information, the receiving device can know which key server to make the request for the decryption key. On receiving the request from the host entity, the key server can generate a key pair comprising an encryption key and a decryption key according to a preselected algorithm. The key server can also generate a random and unique key identifier and can associate the generated key identifier with the encryption key. Further, the key server can transmit the encryption key and the associated key identifier to the host entity.

In an embodiment, at block 604, the host entity can receive the encryption key and the associated the key identifier from the key server. Further, at block 606, the host entity can generate a header that can include the key identifier, the device identifier of the key server from which the encryption key is received and an information identifier associated with the information to be protected for example, a random file ID. The header can also include parameters such as time and date of encryption, GPS location of the key server, the Internet Protocol (IP) address of the key server, etc. Additionally, the host entity can generate a hash for the information to be encrypted that can be used to verify the integrity of the decrypted file at the receiving end.

In an embodiment, at block 608, the host entity can encrypt the information using the received encryption key and can associate the generated header with the encrypted information. At block 610, the host entity can transmit the encrypted information and the associated header to a receiving entity. At block 612, the host entity can transmit the key identifier associated with the encryption key used to encrypt information and the header along with the authorization information to the key server. The authorization information can be in the form of the matrix indicating receiving entities, which are authorized to access the transmitted information. In an implementation, the host entity can transmit a header hash instead of the header to the key server. Further, the key server can bind the header with device identifier of the host entity and the authorization information together, and can store the combined information as one record in a database operatively coupled with the key server. Lastly, the original information in the host entity can be erased, such that only encrypted information can be available for further use.

Figure 7:
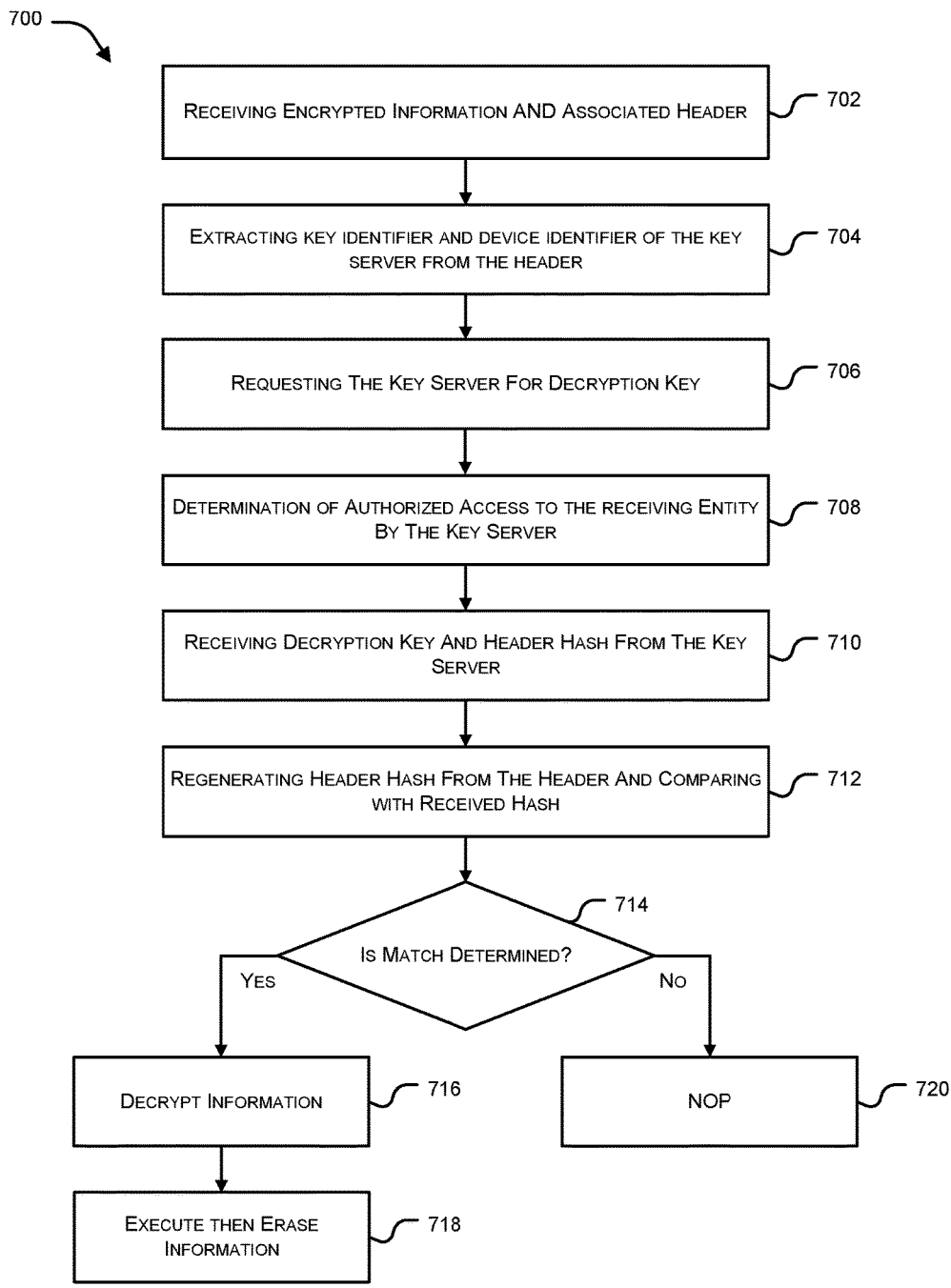
FIG. 7 is a flow diagram illustrating decryption of information at the receiving entity in accordance with an embodiment of the present disclosure.

FIG. 7 is a flow diagram illustrating decryption of information at the receiving entity in accordance with an embodiment of the present disclosure.

In an embodiment, the process to decrypt the information at the receiving entity can be initiated at block 702, where the receiving entity can receive the encrypted information along with the header associated with the encrypted information. At block 704, the receiving entity can extract the key identifier and device identifier of the key server from the header such that a request for decryption key can be made to corresponding key server having the extracted device identifier at block 706. At block 706, the request for decryption key can be made to the key server by transmitting the extracted key identifier to the key server. At block 706, on receiving the key identifier, the key server can locates the key record using the key identifier, thereby, the key sever can check the matrix indicating authorization information to determine whether the receiving entity is authorized to access the information or not. The key server can make said determination based on multiple criteria based on the matrix to approve or disapprove releasing the decryption key to the receiving entity. The multiple criteria can include whether the receiving entity is in the list of approved receiving entities provided by the host entity, whether the request does not exceed the threshold of number of times the decryption key can be released to the receiving device, and whether the releasing of the decryption key is within an approved time period. In response to the determination that the receiving entity is authorized to access the encrypted information, the key server releases the decryption key and the receiving entity receives the decryption key that can be used to decrypt the encrypted information. Alternately, at block 710, the receiving entity can receive the decryption key as well as the header hash from the key server. In an implementation, the receiving entity can receive header hash information that can include header hash and hash method, the receiving can to generate a new header hash with the hash method and compare the new header hash and the header hash received in the header hash information from the key server so as to verify the integrity of the header associated with the encrypted information. Therefore, at block 712, the receiving entity can regenerate the hash from the header to compare with the received hash in case the receiving entity has received the encrypted information by hashing the information that was required to be protected. At block 714, the receiving entity can determine if the hashes match.

Matching of the two hashes can indicate the encrypted information is the correct one and un-corrupted. Further at block 716, said encrypted information would be decrypted. Further, the decrypted information can be retained for a specific time period that can be indicated in the matrix and at block 718, the decrypted information can be erased. In an embodiment, if the decrypted information is a computer instruction for a receiving entity such as a client entity to perform certain task, the information can be deleted after execution by the client entity. Then the time limit for erasing the decrypted information is automatically determined. The technique of erasing the decrypted information after an appropriate time limit ensures that a minimum amount of data resides in the network. Alternately, a failure to match the two hashes can switch the receiving device 720 into a No-Operation NOP state, such that the receiving entity can wait for further instructions from the host device.

Those skilled in the art would appreciate that process is elaborated with reference to FIGS. 6 and 7 can appropriately find an application in commanding a client entity to systematically turn on actuators, report location and perform sensor data gathering, however, information from the client entity can be require to be sent back to the host device for storage and analysis eventually.

Figure 8:
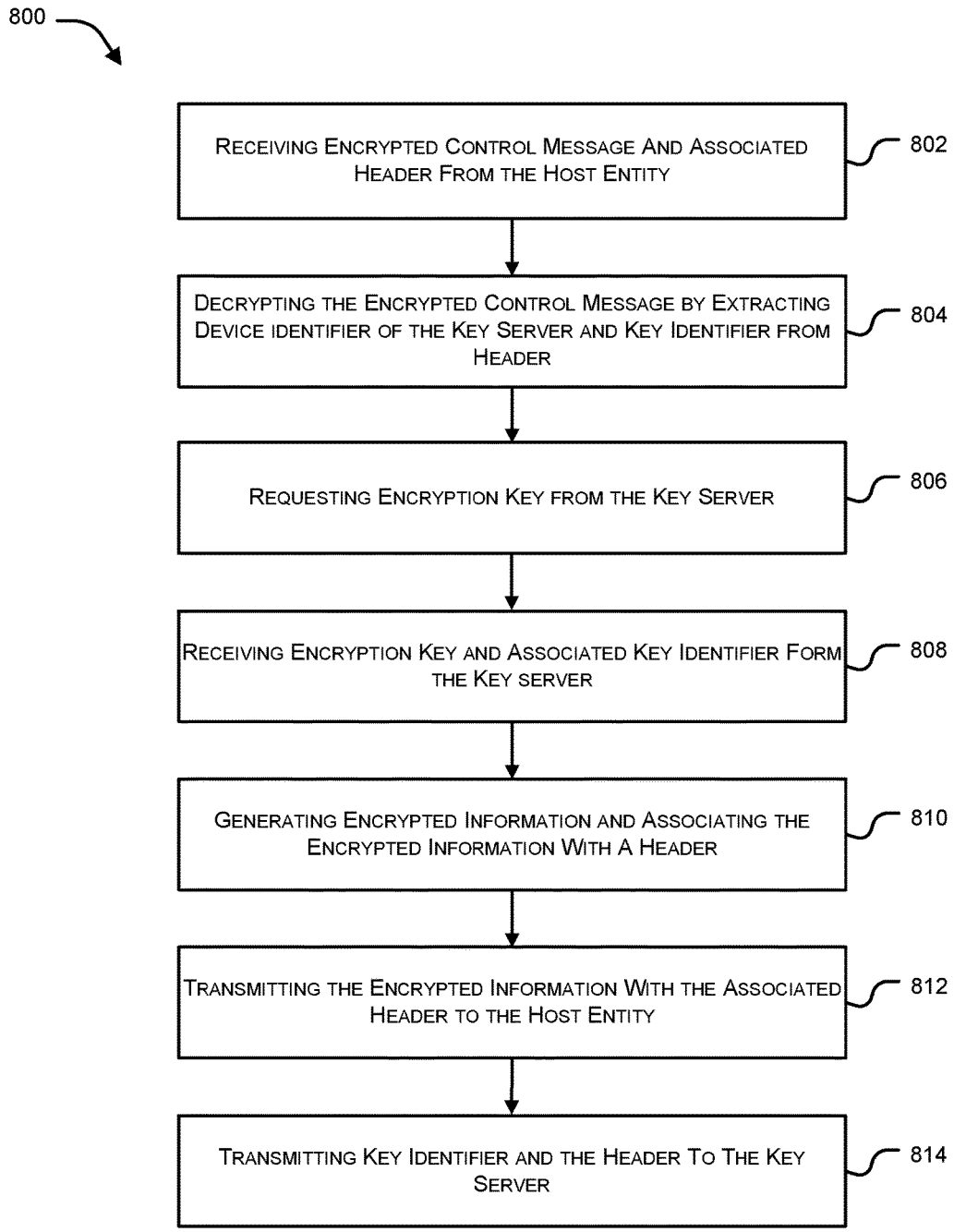
FIG. 8 is a flow diagram illustrating transmitting of information from a client entity to a controlling host entity in accordance with an embodiment of the present disclosure.

FIG. 8 is a flow diagram illustrating transmitting of information from a client entity to a controlling host entity in accordance with an embodiment of the present disclosure.

In an embodiment, the process of transmission and encryption by a receiving device such as the client entity controlled by the host device can be initiated a block 802 where the client entity can receive an encrypted information and associated header from the host device that can be an encrypted control message instruction to transmit information. The host entity can set up the matrix such that the client entity is provided an authorized access. At block 804, the client entity can decrypt the encrypted control message by extracting the key identifier and device identifier of the key server to decrypt the encrypted information. As the control message is an instruction to transmit the information by the client entity. Thus, the client entity can now be operated as a transmitting entity and can follow a process similar to a process of performing encryption by the host entity. At block 806, the client entity can request encryption key from the key server corresponding to the device identifier extracted from the header. At block 808, the client entity can receive an encryption key and an associated key identifier from the key server. At block 810, the client entity can generate the header comprising of information identifier, the key identifier, and the device identifier of the key server. The header can also contain other parameters such as time and date of encryption, GPS or RTLS location and the like. Also, the client entity can generate a hash for the information to be encrypted. Further, the client entity can encrypt the information and can associate the encrypted information with the header. At block 812, the client entity can transmit the encrypted information and the associated header to the receiving device that can be the host entity that issued the encrypted control message. Further at block 814, the entity can transmit the key identifier and the header or the header hash to the key server. The key server can retrieve the matrix generated by the host entity and can bind said matrix, device identifier of the client entity, the header, and stores it as a key record.

It would be appreciated that in the process described with reference to FIG. 8, the host entity send a control message to the client entity to transmit information, and subsequently both the client entity and the key server entity observes the matrix that was generated by host entity. Thus, there is a logical connection between the three devices i.e. the host entity, the key server and the client entity. An adherence to the key serving and header, and key record protocol is required as the client entity cannot operate independently and the host entity performs legitimate controlling of the client entity. Therefore, embodiments of the present disclosure provide a technique that can allow devices of a network to operate autonomously for a prolonged period of time.

According to an implementation, during network initialization or network rebooting, it is important for a host entity to send an instruction to a client entity. The first instruction from the host entity would let the client entity know the reporting host entity, and by inference, which key server should be requested to receive the encryption key from when the client entity receives an instruction to transmit, in accordance to the matrix generated by host entity. Also, according to an implementation, the client entity can make un-prompted status report after the host entity sends detailed instruction to the frequency of reporting, which can stored in memory of the client entity.

It would be appreciated by the one skilled in the art that according to various embodiments of the present disclosure, all sensitive data flow between various devices within a network can be encrypted. All control messages e.g. computer command instructions can be encrypted, and computer instruction execution by any device would not be allowed unless the control message is successfully decrypted. Thus, the present disclosure provides secure communications between various devices of the network.

Embodiments of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A method comprising:

performing, by one or more hardware processors of at least one host entity of one or more host entities implemented in a network:

storing plurality of device identifiers, each device identifier corresponding to one of plurality of devices connected in the network to allow access and to share information between the plurality of devices, said plurality of devices comprising the one or more host entities, one or more client entities and one or more key servers;

storing an association between one or more devices of the plurality of devices, the association being represented as pairing of device identifiers corresponding to the one or more devices connected to over a communication link in the network;

in response to an encryption key request by the at least one host entity to a key server selected from the one or more key servers, receiving an encryption key generated by the key server and a key identifier associated with said encryption key;

generating a header comprising an information identifier associated with an information to be protected, the device identifier corresponding to the key server and the key identifier associated with the encryption key;

encrypting said information using said encryption key and associating the header with the encrypted information;

transmitting said encrypted information and the associated header to at least one receiving entity, the at least one receiving entity being selected from the one or more host entities and the one or more client entities connected to the at least one host entity over a communication link;

transmitting an authorization information indicating a set of receiving entities authorized to access the information, said key identifier, and said header to the key server; and wherein on receiving the encryption key request from the at least one host entity, the key server generates a key pair comprising the encryption key and a decryption key, assigns the key identifier to the encryption key and transmits said encryption key and said key identifier to the at least one host entity.

2. The method of claim 1, wherein on transmission of said authorization information, said key identifier, and said header to the key server, the key server stores the authorization information, the device identifier of the at least one host entity and the header as a record in a database.

3. The method of claim 2, wherein on transmission of said encrypted information and the associated header to the at least one receiving entity, the at least one receiving entity:
   extracts, the key identifier and the device identifier corresponding to the key server from the header;
   requests, the key server, for the decryption key by transmitting the key identifier to said key server;
   in response to determination that the at least one receiving entity is authorized to access the encrypted information, receives the decryption key from the key server; and
   decrypts the encrypted information using the received decryption key.

4. The method of claim 3, wherein the determination that the at least one receiving entity is authorized to access the information is performed by the key server, by matching a record corresponding to the key identifier and verifying authorization from authorization information associated with the matched record.

5. The method of claim 1, wherein the authorization information further authorizes at least one client entity of the one or more client entities to transmit information to the at least one host entity.

6. The method of claim 5, wherein the at least one client entity transmits the information on receiving a control message from the at least one host entity.

7. The method of claim 1, wherein the authorization information is in form of a matrix comprising the device identifier of each receiving entity of the set of receiving entities authorized to access the information.

8. The method of claim 7, wherein the matrix further comprises conditional authorization information including a threshold for number of times each receiving entity of the set of receiving entities can make the request and time period for which the each receiving entity of the set of receiving entities can make the request.

9. The method of claim 8, wherein the at least one receiving entity receives the decryption key on verification of conditional authorization information.

10. The method of claim 1, wherein the key pair is generated using any of an asymmetrical key scheme or a symmetrical key scheme.

11. The method of claim 1, wherein the one or more client entities is selected from a position sensor, a motion sensor, a location sensor, an environmental sensor, or an electro-optical actuator.

12. A system, comprising:
   one or more hardware processors of at least one host entity of one or more host entities implemented in a network; and
   a memory coupled to the one or more processors and comprising computer readable program code embodied in the memory that is executable by at least one of the one or more processors to perform:
   storing plurality of device identifiers, each device identifier corresponding to one of plurality of devices connected in the network to allow access and to share information between the plurality of devices, said plurality of devices comprising the one or more host entities, one or more client entities and one or more key servers;
   storing an association between one or more devices of the plurality of devices, the association being represented as pairing of device identifiers corresponding to the one or more devices connected to over a communication link in the network;
   in response to an encryption key request by the at least one host entity to a key server selected from the one or more key servers, receiving an encryption key generated by the key server and a key identifier associated with said encryption key;
   generating a header comprising an information identifier associated with an information to be protected, the device identifier corresponding to the key server and the key identifier associated with the encryption key;
   encrypting said information using said encryption key and associating the header with the encrypted information;
   transmitting said encrypted information and the associated header to at least one receiving entity, the at least one receiving entity being selected from the one or more host entities and the one or more client entities connected to the at least one host entity over a communication link;
   transmitting an authorization information indicating a set of receiving entities authorized to access the information, said key identifier, and said header to the key server;
   wherein on receiving the encryption key request from the at least one host entity, the key server generates a key pair comprising the encryption key and a decryption key, assigns the key identifier to the encryption key and transmits said encryption key and said key identifier to the at least one host entity.

13. The system of claim 12, wherein on transmission of said authorization information, said key identifier, and said header to the key server, the key server stores the authorization information, the device identifier of the at least one host entity and the header as a record in a database.

14. The system of claim 13, wherein on transmission of said encrypted information and the associated header to the at least one receiving entity, the at least one receiving entity:
   extracts, the key identifier and the device identifier corresponding to the key server from the header;
   requests, the key server, for the decryption key by transmitting the key identifier to said key server;
   in response to determination that the at least one receiving entity is authorized to access the encrypted information, receives the decryption key from the key server; and
   decrypts the encrypted information using the received decryption key.

15. The system of claim 14, wherein the determination that the at least one receiving entity is authorized to access the information is performed by the key server, by matching a record corresponding to the key identifier and verifying authorization from authorization information associated with the matched record.

16. The system of claim 12, wherein the authorization information is in form of a matrix comprising the device identifier of each receiving entity of the set of receiving entities authorized to access the information.

17. The system of claim 16, wherein the matrix further comprises conditional authorization information including a threshold for number of times each receiving entity of the set of receiving entities can make the request and time period for which the each receiving entity of the set of receiving entities can make the request.

18. A computer program product, comprising:
- a non-transitory computer readable storage medium comprising computer readable program code embodied in the medium that is executable by one or more processors of at least one host entity of one or more host entities implemented in a network to perform:
- storing plurality of device identifiers, each device identifier corresponding to one of plurality of devices connected in the network to allow access and to share information between the plurality of devices, said plurality of devices comprising the one or more host entities, one or more client entities and one or more key servers;
- storing an association between one or more devices of the plurality of devices, the association being represented as pairing of device identifiers corresponding to the one or more devices connected to over a communication link in the network;
- in response to an encryption key request by the at least one host entity to a key server selected from the one or more key servers, receiving an encryption key generated by the key server and a key identifier associated with said encryption key;
- generating a header comprising an information identifier associated with an information to be protected, the device identifier corresponding to the key server and the key identifier associated with the encryption key;
- encrypting said information using said encryption key and associating the header with the encrypted information;
- transmitting said encrypted information and the associated header to at least one receiving entity, the at least one receiving entity being selected from the one or more host entities and the one or more client entities connected to the at least one host entity over a communication link;
- transmitting an authorization information indicating a set of receiving entities authorized to access the information, said key identifier, and said header to the key server;
- wherein on receiving the encryption key request from the at least one host entity, the key server generates a key pair comprising the encryption key and a decryption key, assigns the key identifier to the encryption key and transmits said encryption key and said key identifier to the at least one host entity.

* * * * *

UNITED STATES PATENT AND TRADEMARK OFFICE
CERTIFICATE OF CORRECTION

PATENT NO. : 10,164,951 B2
APPLICATION NO. : 15/961868
DATED : December 25, 2018
INVENTOR(S) : Kenneth Keung Yum Yu et al.

Page 1 of 1

It is certified that error appears in the above-identified patent and that said Letters Patent is hereby corrected as shown below:

On the Title Page

Item (73), Assignee: Should read SKY1 Technology Limited, Hong Kong (HK)

Signed and Sealed this
Nineteenth Day of March, 2019

Andrei Iancu
*Director of the United States Patent and Trademark Office*